United States Patent [19]

Khan et al.

[11] Patent Number: 5,034,964
[45] Date of Patent: Jul. 23, 1991

[54] N:1 TIME-VOLTAGE MATRIX ENCODED I/O TRANSMISSION SYSTEM

[75] Inventors: Aurangzeb K. Khan, San Bruno, Calif.; Robert Horst, Champaign, Ill.; Lordson L. Yue, Sunnyvale, Calif.

[73] Assignee: Tandem Computers Incorporated, Cupertino, Calif.

[21] Appl. No.: 268,423

[22] Filed: Nov. 8, 1988

[51] Int. Cl.⁵ .................. H04B 14/04; H04L 25/34
[52] U.S. Cl. ........................... 375/25; 375/17; 370/116
[58] Field of Search .............. 375/17, 24, 25, 20; 358/426; 370/37, 112, 116, 114; 341/56; 340/825.77; 328/62; 307/243

[56] References Cited

U.S. PATENT DOCUMENTS 2,650,266  8/1953  Browning ..................... 370/37
3,838,296  9/1976  Mc Lead ..................... 370/112 X
3,979,561  9/1976  Hinkle et al. ................ 370/114 X Primary Examiner—Douglas W. Olms
Assistant Examiner—Tesfaldet Bocure
Attorney, Agent, or Firm—Townsend and Townsend

[57] ABSTRACT

Encoding and decoding circuits are described for functioning as both a time and voltage based transmission system. Multiple binary inputs can be transmitted and received on a single I/O pin by encoder and decoder circuits using high speed emitter coupled-like logic.

8 Claims, 9 Drawing Sheets

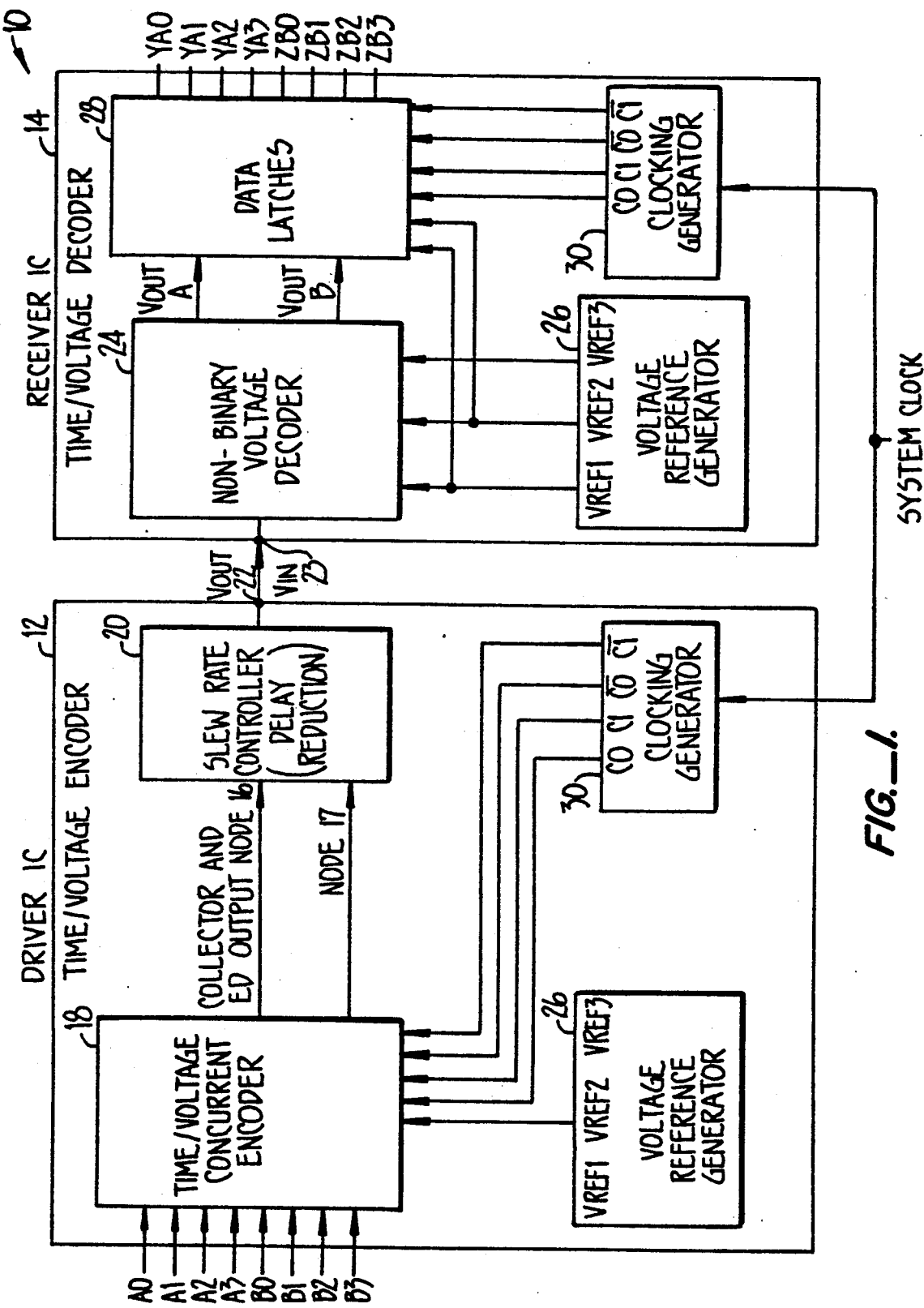
FIG._1.

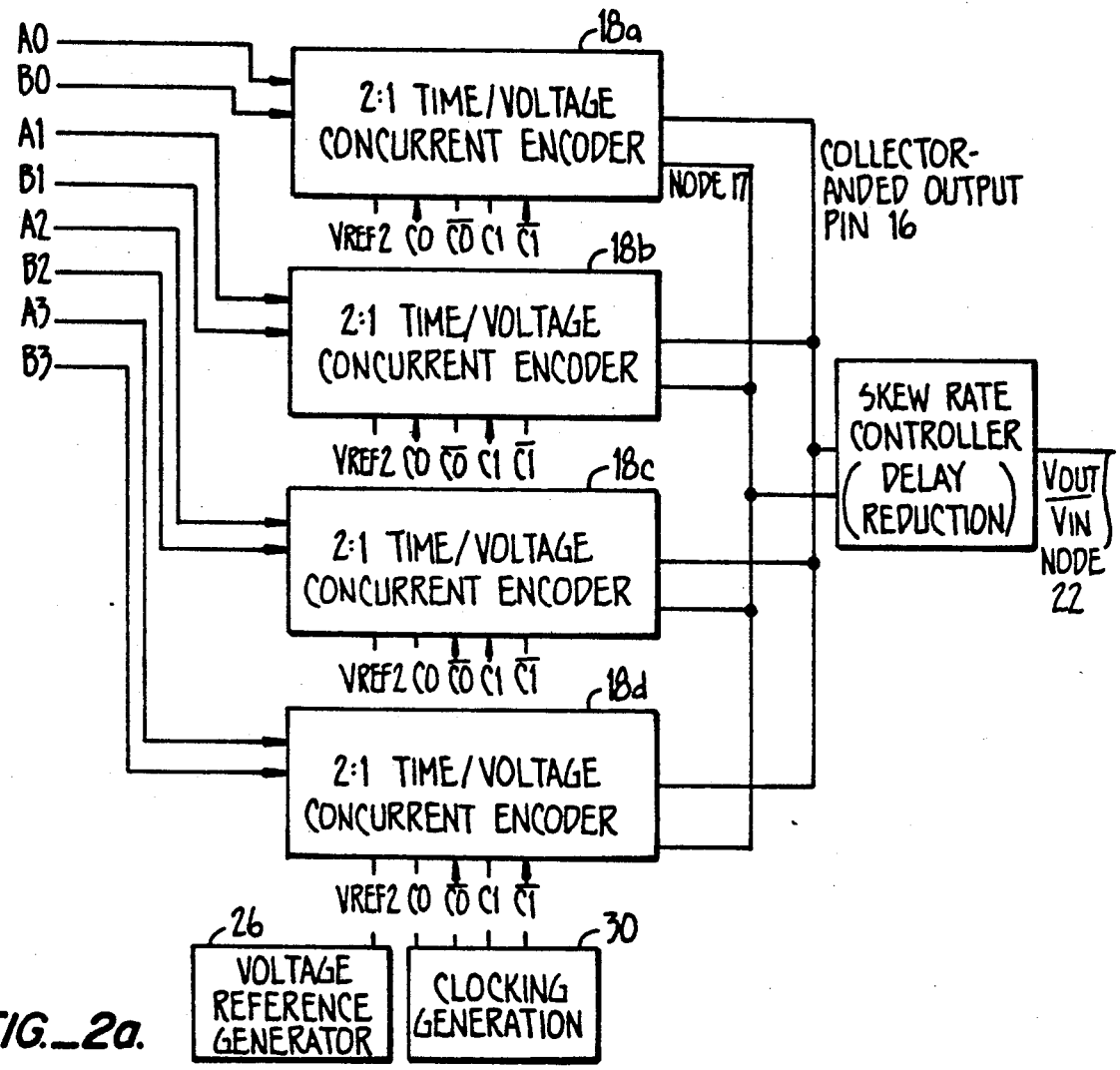
FIG._2a.
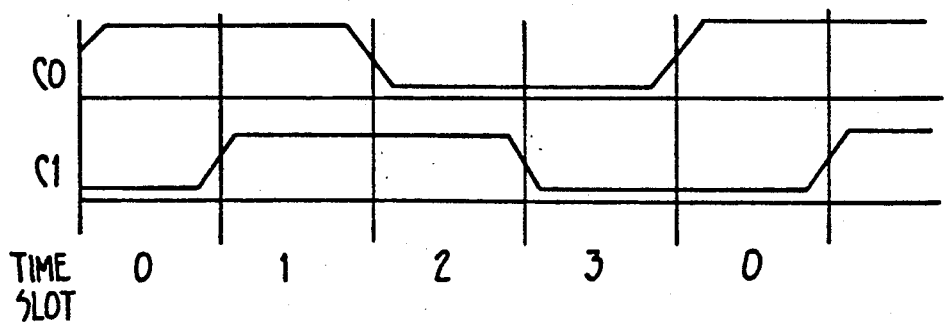
FIG._2b.

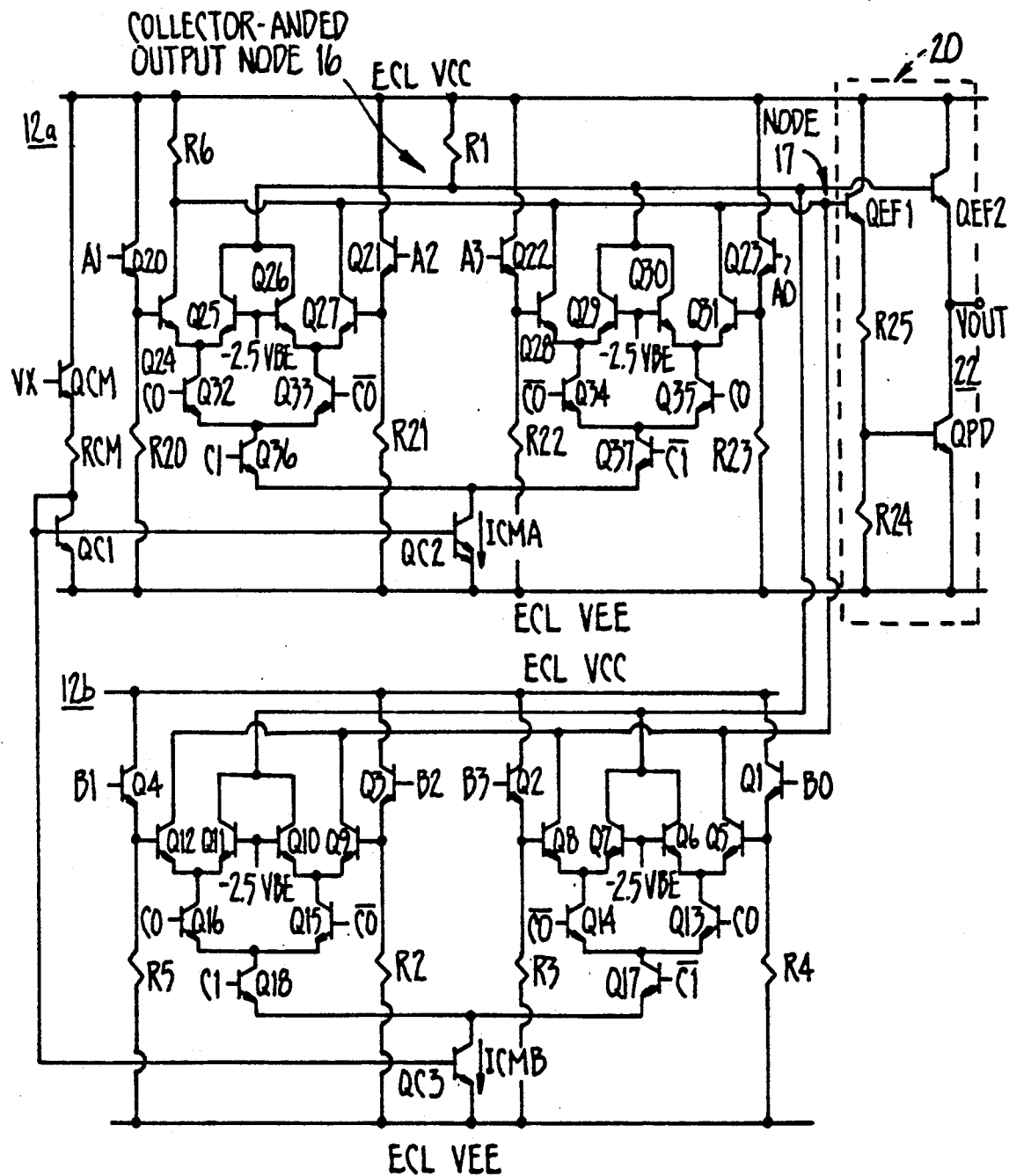
FIG._3.

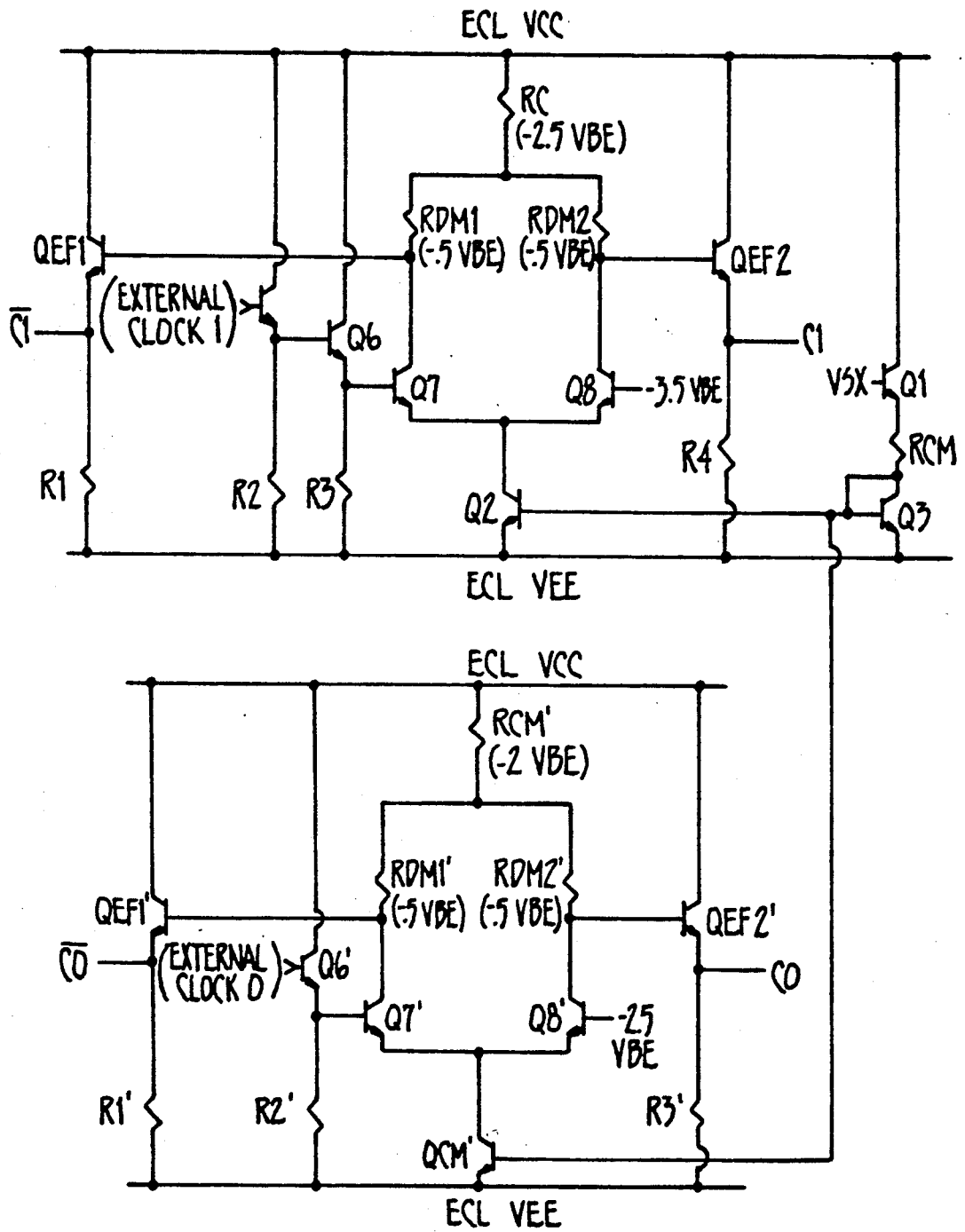
FIG_4.

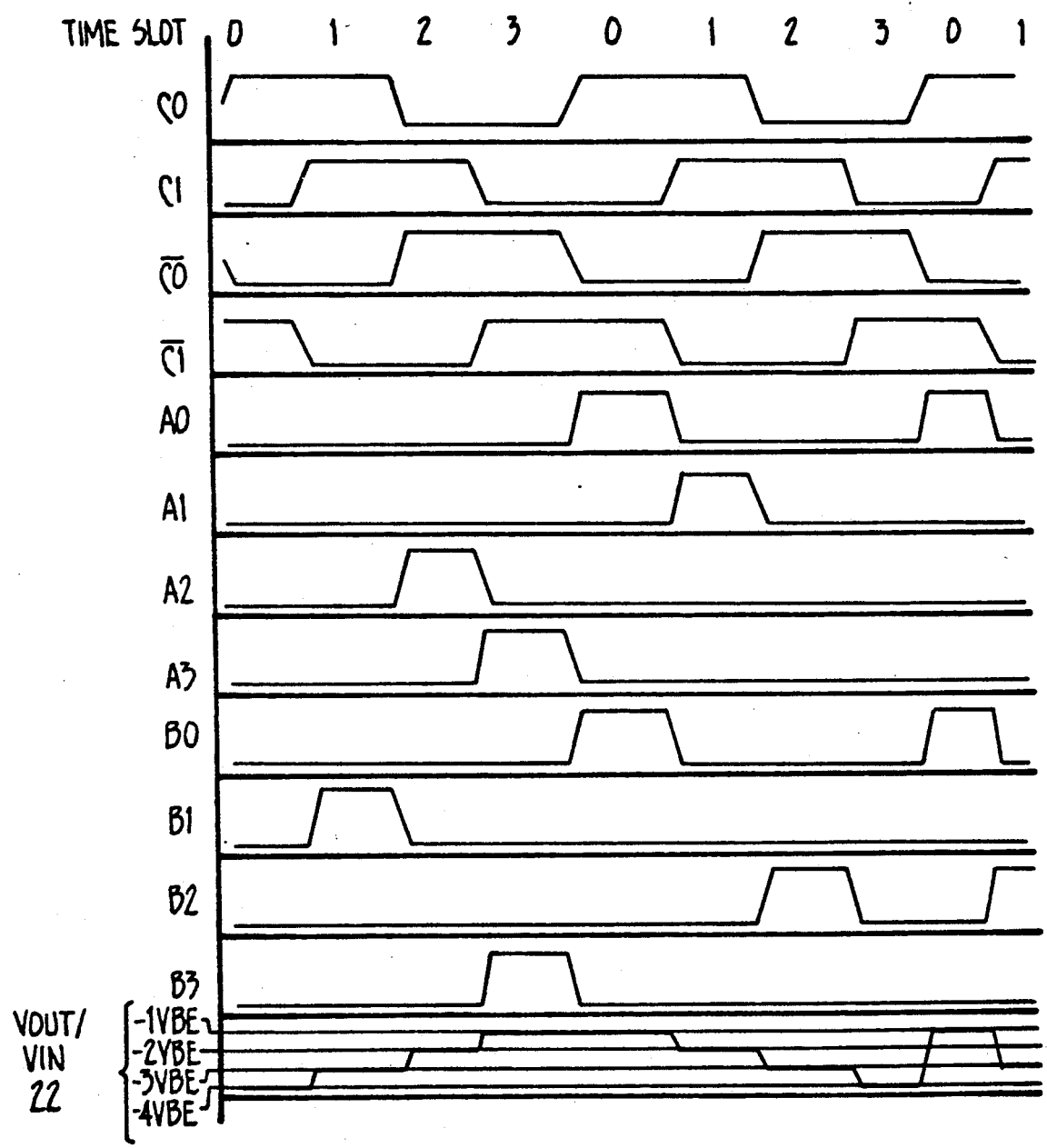
FIG._5.

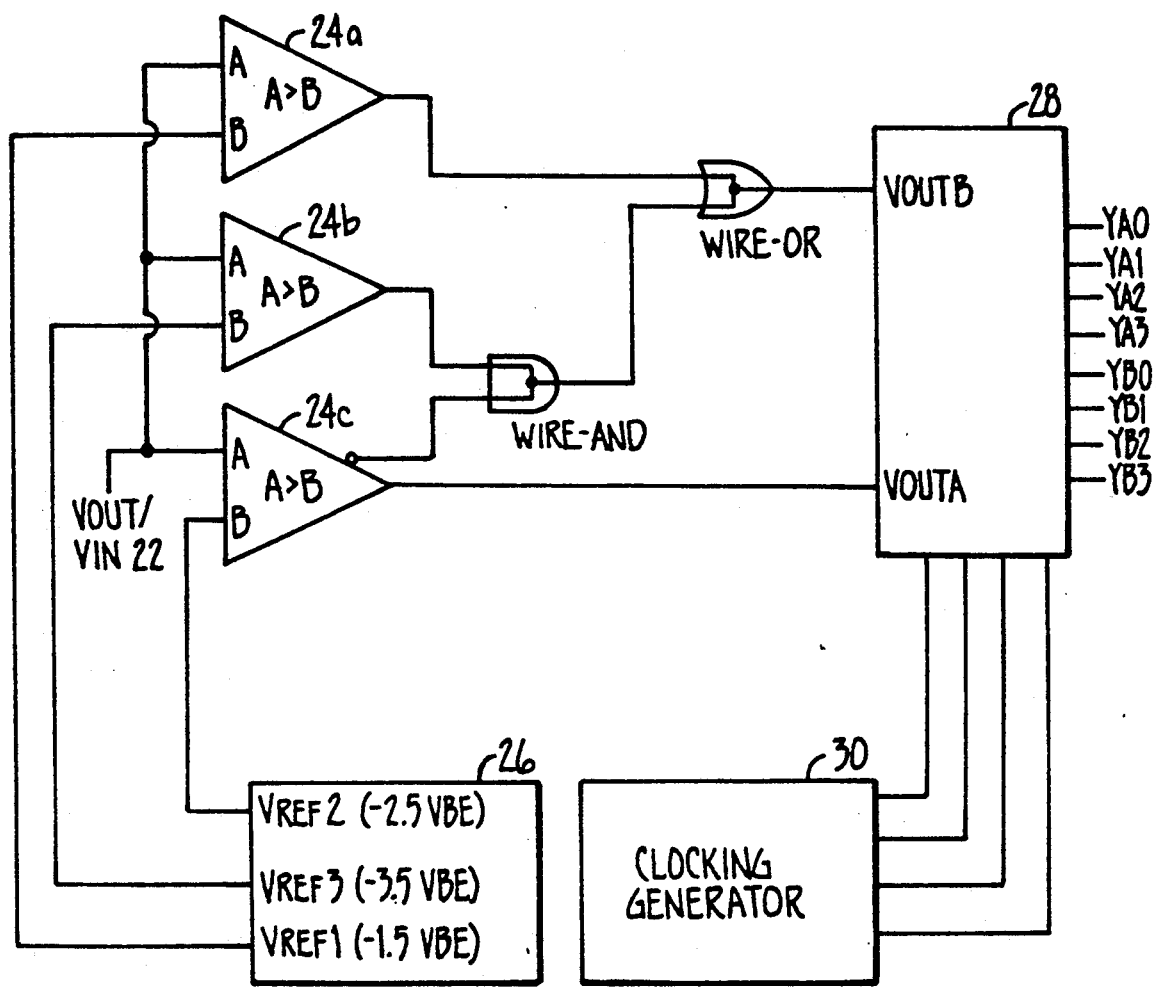
FIG._6.

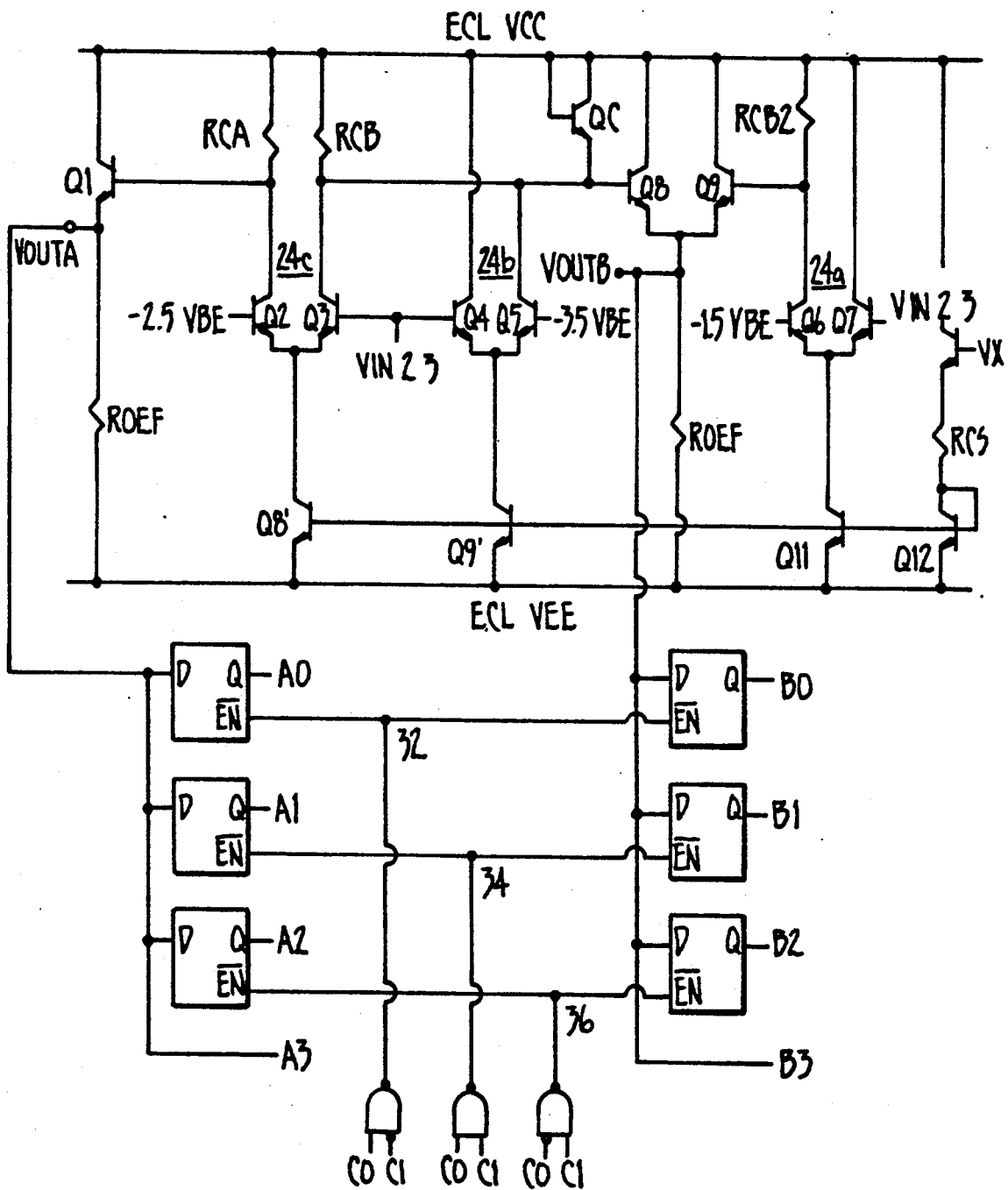
FIG._7.

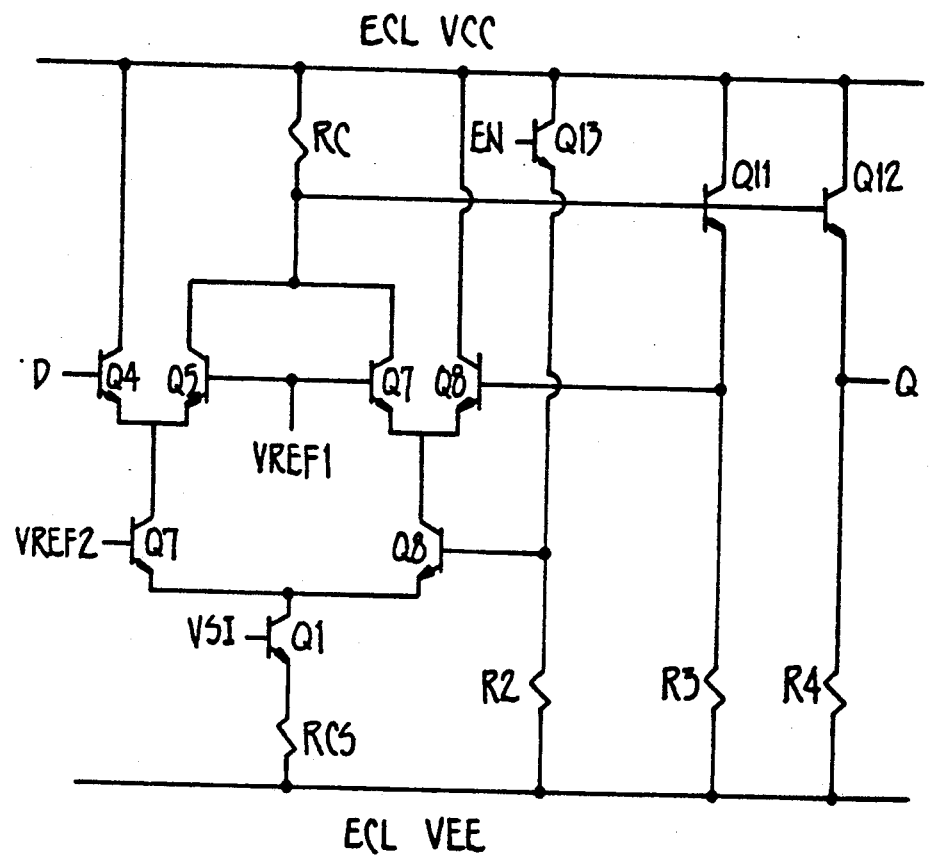
FIG._8.

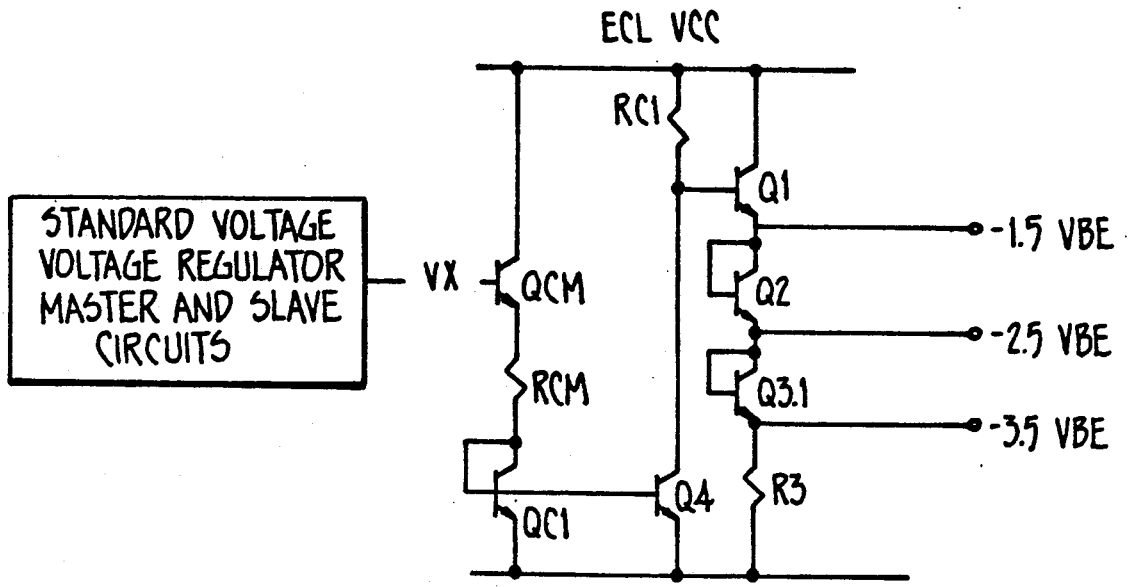
FIG._9a.
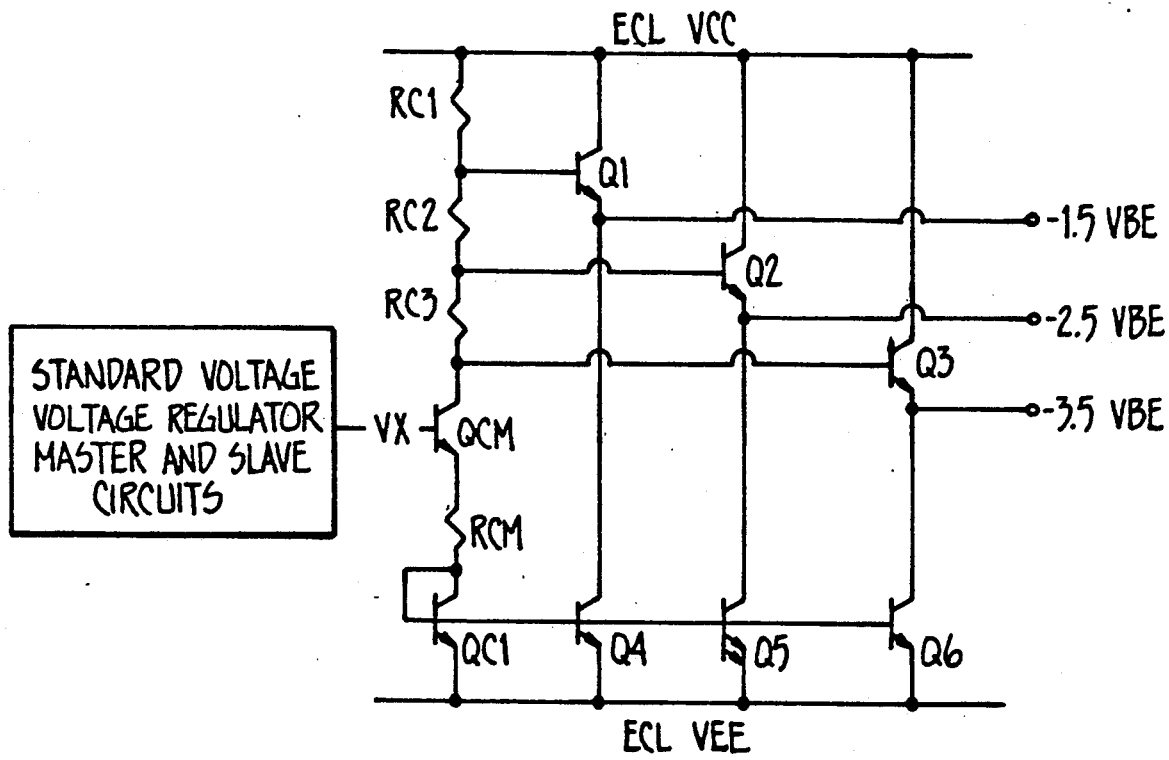
FIG._9b.

N:1 TIME-VOLTAGE MATRIX ENCODED I/O TRANSMISSION SYSTEM

BACKGROUND OF THE INVENTION

1. Field of the Invention

This invention relates to electronic circuits, and in particular to a concurrent time and voltage matrix non-binary encoding circuit capable of transmitting and receiving a large number of multiple binary signals on a single physical I/O pin. By incorporating novel concurrent time and voltage encoding techniques, the present invention can N:1 encode N binary input signals onto a single non-binary data bit stream, and can 1:N decode the single non-binary data bit stream into N binary output signals.

2. Description of the Prior Art

Multiplexing circuits for encoding and decoding multiple binary signals are well known. In a conventional multiplexing scheme, binary signals are encoded and decoded by one of two methods. The first method, time-based multiplexing incorporates timedependent encoding of N bits of data into one or more discrete time slots. Each time slot represents either one clocking period, wherein the encoded output bit rate equals the clocking frequency, or less than one clocking period if multistage time multiplexers are used. Multistage multiplexing requires a pair of data bits to be multiplexed at each stage. If four bits of data are to be multiplexed, two stages are needed with a special time slot for each stage. Such a system is described in the article entitled "A 4:1 Time-Division Multiplexer IC for Bit Rates up to 6 Gbit/s Based on a Standard Bipolar Technology" published in the Journal of Solid-State Circuits, Vol, SC-21, No. 5, October 1986.

The second method, voltage-based multiplexing, is capable of encoding N bits of data into one or more discrete voltage levels during a set time period. Conventional voltage multiplexing circuits require pre-charging of the output line and switching the pre-charged line to multiple logic levels corresponding to binary input states. Such a system is described in an article by Singh entitled "Four Valued Buses for Clocked CMOS VLSI Systems" published by the IEEE in 1987. The time required to pre-charge the output line reduces the encoding time period, and thus, the multiplexing speed of the conventional voltage multiplexing circuit.

Using either a time or voltage multiplexing method allows only a limited number of bits of data to be transmitted and received on a single I/O pin. However, with recent increases in device density within an integrated circuit (IC), there is a need for greater number of bits of data to be multiplexed within a given time cycle. One of the major limitations of VLSI IC technology is the limited availability of I/O signal pads. I/O pad density on a VLSI IC or chip is directly proportional to the chip's peripheral dimensions. Although device density has increased drastically in recent years, I/O pad density has remained relatively constant. This causes most large scale digital designs to be I/O-constrained. Typically, a much larger number of I/O pads than are available are needed to effectively utilize the increased gate density. In order to effectively utilize the increase in device density, it is imperative that multiplexing schemes use the limited number of I/O pads to transmit as many binary bits of data as possible.

Conventional multiplexing techniques are unable to transmit large numbers of binary bits of data on a limited number of I/O pads. Typical time-multiplexing techniques can encode N bits of data during one clocking cycle. N is generally limited to one bit if multistage time multiplexer circuits are not used. If two stage time multiplexers are used, N can be extended to two bits. Even with two bits of encoded data per clocking cycle, the number of virtual I/O pins is far below what is needed to keep pace with current device densities. When typical voltage-multiplexing techniques are used only N bits, using $2^{**}N$ discrete output voltages, can be encoded per time slot. Furthermore, in some instances, depending on the chosen technology, conventional voltagemultiplexing circuitry requires that the output lines be pre-charged prior to logic level shifting. See the above referenced article by Singh. The time required to precharge will limit the number of clocking cycles within a given time period. In turn, this would reduce the encoded data output frequency. Because the encoded data output frequency is so slow, the number of binary input signals that can be multiplexed within a given time frame is severely limited.

SUMMARY OF THE INVENTION

The present invention combines both time and voltage multiplexing techniques in a high speed non-binary I/O transmission circuit. By combining these two independent signal encoding means into one complete matrix encoding methodology, a greater number of N binary input signals can be multiplexed over a single I/O pin than conventional schemes.

In the present system, each system clock cycle is divided into M time slots. During each of these time slots a selected number of binary signals is voltage encoded into one discrete voltage level. One of these encoded voltage levels is transmitted during each time slot. If the selected number of binary signals encoded during each time slot is equal to X, then $N=M*X$ binary signals may be transmitted through one output during a system clock cycle.

According to one aspect of the invention, distinct subsets of a set of N binary signals are selected to be voltage encoded during each of the M time slots. The selection and voltage encoding operations are concurrently performed by the present system which includes a novel circuit integrating the time and voltage encoding mechanisms to drastically reduce propagation delays.

According to a further aspect of the invention, a decoder provides a true output in response to a received discrete encoded voltage level being in a defined voltage sub-interval of a predetermined voltage interval. Generally, the encoder encodes X received binary input signals onto one of $2^{**}X$ discrete voltage levels. This discrete voltage is transmitted to the decoder and converted to X binary output signals which correspond to the X binary input signals. The selection, encoding, transmission, and decoding of X binary signals is effected in one time slot to facilitate an overall transmission rate of N binary signals for each system clock cycle.

According to one aspect of the invention, two binary signals are decoded from one of four discrete voltage levels received by a single stage voltage interval decoder. The decoder receives three reference voltage levels to partition a voltage interval into four sub-intervals. The value of the first binary output signal is in a first state only if the encoded received discrete voltage interval is in the upper two subintervals. The value of the second binary output signal is in a first state only if the received discrete voltage level in the first of third voltage sub-interval. The decoding of the first and second binary output signals is concurrently performed by the novel decoding circuitry to reduce propagation delays.

According to another aspect of the invention, the encoder includes a slew rate controller that provides an output driving capability that is proportional to the voltage delta between the prior discrete voltage level and the presently encoded discrete voltage level to minimize delay due to the loading effect of the output capacitance. In one embodiment, a unique ECL-like pushpull circuit is utilized to obtain this effect.

According to still further aspects of the invention, circuitry internal to the encoding and decoding systems receives the system clock and defines the time slots necessary for time-voltage encoding. Thus no synchronization signals need be included in the data stream. Further, the integration of the selection and encoding circuitry reduces the area required to implement the invention in an integrated circuit.

Other advantages and features of the invention will become apparent in view of the drawings and following detailed description.

BRIEF DESCRIPTION OF THE DRAWINGS

FIG. 1 is a block diagram of one embodiment of the present invention.

FIG. 2a is a block diagram of an 8:1 time/voltage encoder network of the present invention.

FIG. 2b is a graph containing clocking signals and time slots.

FIG. 3 is a circuit schematic diagram of the 8:1 time/voltage encoder network.

FIG. 4 is a circuit schematic diagram of the clocking generator circuit and the clocking signals utilized in the embodiment of FIGS. 1, 2, 3, 6, 7.

FIG. 5 is a timing diagram depicting the encoder inputs and single output signals at various time periods.

FIG. 6 is a block diagram and logic diagram of the 1:8 time/voltage decoder network of the present invention.

FIG. 7 is a circuit schematic diagram of the 1:8 time/voltage decoder network.

FIG. 8 is a circuit schematic diagram of the latch/select network.

FIG. 9a is a circuit schematic diagram of a conventional voltage reference generator.

FIG. 9b is a circuit schematic diagram of the voltage reference generator of the present invention.

DETAILED DESCRIPTION OF THE PREFERRED EMBODIMENT

FIG. 1 is a block diagram illustrating one embodiment of the present invention. In FIG. 1, a time/voltage matrix encoded transmission system 10 includes both an encoder 12 and decoder 14 systems. The encoder 12 of the present embodiment receives eight binary input signals on eight inputs pins A0–A3 and B0–B3. The signals on the eight input pins are converted to a single data signal stream on collector-ANDed output nodes 16 and 17 through use of a time/voltage concurrent encoder 18. Upon receiving a combination of selected clocking signals C0, C1, C0 bar and C1 bar, the time/voltage concurrent encoder 18 generates a voltage and time-based output signal on the collector-ANDed output nodes 16 and 17. These internal input pins, A0–A3 and B0–B3, are virtual output pins relative to a physical VOUT pin 22.

A slew rate controller 20 receives the various voltage levels on the collector-ANDed output nodes 16 and 17 and provides for rapid transitions between the discrete voltage levels at the VOUT pin 22.

The converted levels are sent from the single VOUT pin 22 to a VIN pin 23 at the decoder 14. The decoder 14 includes a non-binary voltage converter 24 for receiving and comparing the voltage levels received on a VIN pin 23 with externally supplied voltage references Vref1, Vref2, and Vref3. Voltage reference generator 26 supplies the non-binary voltage converter 24, the time/voltage concurrent encoder 18, and the data latches with the necessary reference voltages, wherein each reference voltage is fixed at a separate and distinct voltage level. As the non-binary voltage converter 24 receives each voltage level on the VIN pin 23, the respective level is compared with the three voltage references Vref1, Vref2, and Vref3 so that the comparison result corresponds to a high or low state on VOUTA and/or VOUTB output pins. Whatever the voltage logic level on VOUTA or VOUTB, that level will be latched onto output pins YA0–YA3 or ZB0–ZB3 respectively during successive time slots.

Latching is accomplished through a select/latch network 28 which receives a decoded binary level on VOUTA and routes and latches it to a binary output on either YA0, YA1, YA2, or YA3 at a selected time depending upon the clocking state of C0 and C1. The same applies for translating the time/voltage encoded input levels on VOUTB into a binary output on either ZB0, ZB1, ZB2, or ZB3 output pins. The select/latch network 28 and the time/voltage encoder 18 are controlled simultaneously by a clocking generator 30. By enabling the encoder 12 and decoder 14 at the same time, two bits of data can be encoded, transmitted and decoded within one time slot.

Thus for example binary inputs on the encoder input pins A0 and B0 can be encoded, transmitted, and decoded during one time slot, such that the resultant binary signals on output pins YA0 and ZB0 of decoder 14 equals that of encoder 12 inputs A0 and B0.

FIG. 2a is a block diagram illustrating the encoder 12 and its interrelated parts. In an 8:1 embodiment four 2:1 time/voltage concurrent encoder 18a, 18b, 18c and 18d make up the encoder network 18. Each 2:1 time/voltage concurrent encoder encodes the signals on two distinct binary input pins onto an encoded signal on collector-ANDed output nodes 16 and 17 when enabled by a selected pair of clocking signals. For example, 2:1 time/voltage encoder 18a receives inputs on input pins A0 and B0 and is enabled by clocking signals C0 and C1 bar; 2:1 time/voltage encoder 18b receives inputs on A1 and B1 pins and is enabled by clocking signals C0 and C1; 2:1 time/voltage encoder 18c receives inputs on A2 and B2 pins and is enabled by clocking signals C0 bar and C1; and 2:1 time/voltage encoder 18d receives inputs on A3 and B3 pins and is enabled by clocking signals C0 bar and C1 bar. Therefore, with four 2:1 time/voltage concurrent encoders, there need be four distinct strobing windows or time slots to activate each 2:1 time/voltage concurrent encoder.

FIG. 2b illustrates how the four time slots are generated. By taking one clock signal, buffered to provide true and complementary driver outputs and 90 degree time-phasing the true and the complementary signals, C0, C1, C0 bar and C1 bar are generated. The time-phased signals provide 2**2, or four, time-equal time slots 0, 1, 2, and 3, during each of which, two binary inputs of data can be transmitted. At time slot 0, for example, C0 is high and C1 is low (or C1 bar is high). When C0 is high and C1 bar is high, comparator 18a is activated and binary bits on input pins A0 and B0 are transmitted. During time/voltage encode operation the following time transmission protocol is established:

| C1 | C0 | Time Slot | Bits Transmitted |
|----|----|-----------|-----------------|
| 0  | 1  | 0         | A0, B0          |
| 1  | 1  | 1         | A1, B1          |
| 1  | 0  | 2         | A2, B2          |
| 0  | 0  | 3         | A3, B3          |

Referring now to FIG. 3, a circuit schematic diagram of the 8:1 concurrent time/voltage encoder 12 is illustrated. The encoder 12 in FIG. 3 includes the eight virtual data input pins A0–A3 and B0–B3, one output pin VOUT 22, one voltage reference Vref1, and four clocking inputs C0, C1, C0 bar and C1 bar. All eight virtual data inputs can be simultaneously time and voltage multiplexed during one clock cycle onto a single output line, VOUT pin 22. The 8:1 encoder 12 depicted in FIG. 3, consists of two 4:1 time/voltage encoders 12a and 12b, which are collector-ANDed and supplied to the VOUT pin 22, thus achieving 8:1 encoding. Each 4:1 encoder is a triple series-gated, current mirror-based ECL-like circuit, i.e., the circuit is similar to standard binary ECL except that multi-level logic signals are utilized. It has dual-level series-gated clocking inputs C0 (or C0 bar) and C1 (or C1 bar), superimposed on four data inputs, A3–A0 and/or B3–B0.

The operation of the circuit of FIG. 3 to effect time-voltage multiplexing will now be described. For time slot 0, C0 and C1bar are set to enable inputs A0 and B0. The values of the currents through the first collector-ANDed node 16 and the second node 17 will now be described for the four possible combinations of these input values.

If A0 is low the base of Q31 is at −3 Vbe which is less than −2.5 Vbe so that Q31 is off and Q30 is on. Therefore current ICMA flows through R1, node 16, and Q30. Conversely, when A0 is high the base of Q31 is −2 Vbe, which is above −2.5 Vbe, so that Q31 is on and Q30 is off. Therefore, current ICMA flows through R6, node 17, and Q31. The results for B0 are analogous with ICMA replaced by ICMB.

If both A0 and B0 are low, the sum of ICMA and ICMB flows through node 16 and no current flows through node 17; if A0 is low and B0 is high, ICMA flows through node 16 and ICMB through node 17; if A0 is high and B0 is low, ICMA flows through node 17 and ICMB flows through node 16; and if A0 and B0 are both high ICMA and ICMB flow through node 17 and no current flows through node 16.

The voltage at node 16 is VCC less the voltage drop across R1 and the voltage at node 17 is VCC less the voltage drop across R6. From the above it is apparent that these voltage drops vary in opposite senses as the values of A0 and B0 change.

ICMA is given double ICMB current by using a proportional current mirror structure QCM, RCM, QC1, QC2, and QC3. QCM, RCM and QC1 ensure that the mirrored base voltages and currents on QC2 and QC3 are fixed and equal. Since transistor QC2 is double that of QC3, ICMA is always twice ICMB. Furthermore, the ICMB current value, as defined by the current mirror structure, is such that ICMB*R1=1 Vbe. Therefore, the discrete voltage levels on collector-ANDed output node 16 corresponds to 0, −1 Vbe, −2 Vbe and −3 Vbe depending upon the combination of ICMA and/or ICMB flowing through R1, or not flowing through R6. The value of R6 is selected so that the levels at node 17 for the same input states are −2.4 Vbe, −1.6 Vbe −0.8 Vbe and 0.

After the four distinct voltages at collector-ANDed output node 16 and 17 are generated each distinct voltage level on node 16 must be established on the VOUT pin 22 with a minimum of delay to provide for high-speed operation.

This operation is accomplished by the slew rate controller 20 which includes transistors QEF1, QEF2, QPD and resistors R25 and R24 depicted in FIG. 3. By buffering the voltages on collector-ANDed output nodes 16 and 17, the slew rate controller 20 ensures that the slew rates for each discrete voltage level delta on the VOUT pin 22 are proportional regardless of the high capacitive loads. This method provides a speed up to the VOUT pin 22 for larger voltage deltas.

The slew rate controller 20 of the present invention is unique and necessary to the high speed operation of the time-voltage encoding system. Referring back to FIG. 3, the slew rate controller 20 includes a pull-up transistor QEF2 having its base connected to node 16, its collector connected to VCC, and its emitter coupled to VOUT 22 and a pull-down transistor QPD having its collector coupled to VOUT 22, its base connected to a node 30, and its emitter coupled to VEE. Transistor QEF1 has its base connected to node 17, its collector connected to VCC, and its emitter coupled to node 30 through resistor R25. Node 30 is connected to VEE via resistor 24.

The operation of the slew rate controller will now be described. QEF1 and QEF2 are emitter followers that follow the base voltage minus 1 Vbe. Thus, the output voltage on VOUT 22 is the voltage on node 16 minus 1 Vbe. From the above, these discrete quaternary encoded levels are −1 Vbe, −2 Vbe, −3 Vbe, and −4 Vbe.

For a rising edge transition having a high positive delta, e.g., from −4 Vbe to −1 Vbe, QEF2 functions as a level shift down and provides large pull-up drive current to the output load. Conventional output buffers usually have a resistor to VEE or a fixed current source as a termination. Thus, for a falling edge transition having a high delta, e.g., from −1 Vbe to −4 Vbe, only a small pull-down current is provided and the transition is very slow.

The operation of QPD, which is to provide a dynamic pull-down system that pulls down harder when a large falling edge transition occurs and pulls down less hard when a rising edge transition occurs, will now be described.

QPD always supplies some pull-down current at the output so the voltage drop, V(24), across R24 is always equal to about the Vbe of QPD. Thus, the current through R24 is approximately constant. For a falling edge transition, the base-voltage of QEF1 rises and the base-voltage and emitter-voltage of QEF2 falls. The increase of base voltage at QEF1 causes a proportionally increased amount of current to flow through R25. Since the current through R24 is constant this increased current is directed into the base of QPD. This additional base current is further multiplied by the gain of QPD and provides a large pull-down current which is proportional to the base-voltage of QEF1.

Conversely, for rising edge transitions, the base-voltage of QEF2 rises and the base and emitter voltage of QEF1 falls. Thus, more pull-up current and less pull-down current is required. The current through R25 decreases and base current of QPD is reduced to lower the pull-down current at the output. The rise time delay at the output is reduced since charge up time depends on the difference between the emitter current at QEF2 and the collector current at QPD. For large voltage deltas the magnitude of the current through R25 changes the most.

The greatest delay occurs for the largest voltage level transitions because more charge/discharge is required. Hence, the slew rate control circuit 20 is adapted to provide more pull-down current for large falling transitions and less pull-down current for large rising transitions.

For intermediate transitions, e.g., from $-1$ Vbe to $-2$ Vbe, a lesser amount of pull-down current is provided because the required charge/discharge is less. Simulation studies have demonstrated a substantial delay reduction for large deltas.

Combining the time/voltage encoding functions of the 8:1 encoding embodiment of the present invention, 8 binary signals can be encoded into one physical pin according to the following table:

| C1 | C0 | Time Slot | Bits Xmtd | Collector-ANDed(12) Voltage* | VOUT Voltage* |
|---|---|---|---|---|---|
| 0 | 1 | 0 | A0, B0 | $-(ICMA + ICMB)*R1$ | $-4$ Vbe |
|   |   |   |   | $-ICMA*R1$ | $-3$ Vbe |
|   |   |   |   | $-ICMB*R1$ | $-2$ Vbe |
|   |   |   |   | 0 | $-1$ Vbe |
| 1 | 1 | 1 | A1, B1 | $-(ICMA + ICMB)*R1$ | $-4$ Vbe |
|   |   |   |   | $-ICMA*R1$ | $-3$ Vbe |
|   |   |   |   | $-ICMB*R1$ | $-2$ Vbe |
|   |   |   |   | 0 | $-1$ Vbe |
| 1 | 0 | 2 | A2, B2 | $-(ICMA + ICMB)*R1$ | $-4$ Vbe |
|   |   |   |   | $-ICMA*R1$ | $-3$ Vbe |
|   |   |   |   | $-ICMB*R1$ | $-2$ Vbe |
|   |   |   |   | 0 | $-1$ Vbe |
| 0 | 0 | 3 | A3, B3 | $-(ICMA + ICMB)*R1$ | $-4$ Vbe |
|   |   |   |   | $-ICMA*R1$ | $-3$ Vbe |
|   |   |   |   | $-ICMB*R1$ | $-2$ Vbe |
|   |   |   |   | 0 | $-1$ Vbe |

*Note:
all voltages are relative to ECL VCC

In one embodiment of the encoder circuit 12, $-2.5$ Vbe is used as the second voltage reference. Voltage of $-2.5$ Vbe for the second voltage reference requires the use of special 0.5 Vbe voltage swing differential signals to drive C1 (and C1 bar) and C0 (and C0 bar) inputs of the encoder clocking transistors. FIG. 4 illustrates one embodiment of a clocking generator 30 by which 0.5 Vbe differential voltages can be created to drive C1, C1 bar, C0, and C0 bar inputs of the encoder clocking transistors. The inputs (external clock 0 and 1) are standard ECL logic levels. The outputs C0, C0 bar, C1, and C1 bar are set at 0.5 Vbe swings that are needed for clocking the encoder 12. A common mode resistance (RCM) sets the high output levels (VOH) of the output clocks. The differential mode resistors (RDM) are set for a 0.5 Vbe voltage swing, which sets the low output levels (VOL) of the output clocks when the current is steered though them. As shown in FIG. 4, not only will the voltage swings of the clocking output signals be restricted to 0.5 Vbe, but a second reference potential of higher magnitude is placed on Q8' than the third reference potential placed on Q8, thereby allowing a 0.5 Vbe higher VOL/VOH levels on C0 and C0 bar than those on C1 and C1 bar.

An examination of the circuit schematics of the encoder 12 in FIG. 3 will help clarify why the clocking voltage differential levels are set at 0.5 Vbe. As shown in FIG. 3, the encoder 12 has a second voltage reference, Vref2, set at $-2.5$ Vbe. Thus, with respect to only the top 4:1 time/voltage encoder 12a, $Vb(Q25)=Vb(Q26)=Vb(Q29)=Vb(Q30)=-2.5$ Vbe. As illustrated in FIG. 3, the clocking signals C0 and C0bar swing between $-3$ Vbe and $-3.5$ Vbe and the clocking signals C1 and C1bar swing between $-3.5$ Vbe and $-4.0$ Vbe. The 0.5 Vbe differential between C1 and C0 or C1 bar and C0 bar fixes Vbc among all transistors within the encoder current path to be 0.5 Vbe if Vbe is, for example, 1.0 Vbe. By carrying through the voltage drops among transistors within the encoder current path, ECL VEE minimum will be fixed at 5.0 Vbe if $Vbc(QC2)=0.5$ Vbe. Knowing that Vbe is dependent upon temperature, ECL VEE minimum will, consequently, vary as circuit temperature varies. However, even as circuit temperature varies drastically, ECL VEE minimum of 5.0 Vbe ensures that the circuit will continue to operate normally. The following table demonstrates how ECL VEE min. varies as circuit temperature changes:

| Temp. (degrees C.) | Vbe (mV) | Delta Vbe/10x (mV) |
|---|---|---|
| $-55$ | 890 | 45 |
| 0 | 800 | 54 |
| 25 | 760 | 60 |
| 125 | 600 | 90 |

This circuit is therefore capable of proper high speed operation across the stringent 100K commercial specification which requires VEE to be between $-4.2$ V and $-4.8$ V and T, in degrees C., between 0 and 105. This is a significant advantage over other systems described in the literature which require a VEE(min) of $-6.9$ V.

Referring now to FIG. 5, a timing diagram illustrates encoder 12 operation, and the timing sequence among various input signals on input pins A3–A0, B3–B0, C0, C1, C0 bar, and C1 bar, and their effect on the output signal on VOUT pin 22. Beginning with time period 1 or time slot 0, C0 is high and C1 is low. Thus, the binary data on input pins A0 and B0 are transmitted. Since both A0 and B0 are at a low level, both ICMA and ICMB flow through R1, thereby forcing encoded output voltage level on VOUT pin 22 to be $-4$ Vbe. At time slot 1, A1 and B1 are selected. Since A1 is low and B1 is high, only ICMA flows through R1, thereby fixing output voltage level to be $-3$ Vbe. And so the procedure continues for every time slot wherein a distinct voltage level on VOUT pin 22 is representative of a specific combination of binary voltage levels on the selected pair of input pins.

Referring now to FIG. 6, a block diagram and logic diagram of the 1:8 decoder depicts the two major components of the decoder 14: non-binary voltage converter 24 and data latch networks 28. The non-binary voltage converter 24 includes three dual input comparators 24a, 24b, and 24c accompanied by logic hardware to convert a single input on VIN pin 23 to two binary outputs VOUTA and VOUTB. To activate VOUTA to a high output level, input signal voltage on VIN 23 must exceed Vref2 voltage of −2.5 Vbe. Otherwise if the input voltage is less than −2.5 Vbe, then VOUTA will be low. To activate VOUTB, the input voltage must be less than Vref2 but greater than Vref3, or the input voltage must be greater than Vref1.

In this embodiment, Vref3=−3.5 Vbe, Vref2=−2.5 Vbe, and Vref1=−1.5 Vbe. VOUTA is activated if the input level exceeds Vref2 of −2.5 Vbe. Therefore, VOUTA will be high whenever the encoded input level equals −2 Vbe or −1 Vbe. VOUTB is activated if the input level is less than Vref2 but greater than Vref3, or when the input level exceeds Vref1. Therefore, VOUTB will be high whenever the input level equals −3 Vbe or −1 Vbe.

The various logic levels on VOUTA and VOUTB pins are received on select/latch network 28 and transferred to binary outputs YA0 and ZB0, YA1 and ZB1, YA2 and ZB2, or YA3 and ZB3 depending upon which time slot is presently being generated by the clocking signals C0, C1, C0 bar, and C1 bar. The clocking signals and Vrefs generated by clocking generator 30 and voltage reference generator 26 are the same ones generated for the encoder 12.

Referring now to FIG. 7, a circuit diagram of the simultaneous 1:8 time/voltage decoder 14 is illustrated. The decoder 14 comprises three comparator circuits having Vref1, Vref2, and Vref3 reference levels. Vref2 of −2.5 Vbe connects to the base of transistor Q2 of comparator 24c; Vref3 of −3.5 Vbe connects to the base of transistor Q5 of comparator 24b; and Vref1 of −1.5 Vbe connects to the base of transistor Q6 of comparator 24a. Each comparator receives an encoded input VIN which ranges in voltage between −1 Vbe to −4 Vbe. The input VIN is connected to the base of one of the two emitter coupled transistors in each comparator. The base of the other transistor connects to either Vref1, Vref2, or Vref3.

The two emitter coupled transistors of each comparator 24c, 24b, and 24a function as comparators by comparing the VIN signal on the base of one transistor to either the Vref1, Vref2, or Vref3 reference levels on the base of the other transistor. If, for example, VIN voltage is −1 Vbe, making it of higher voltage magnitude than Vref1, Vref2, and Vref3, references, then transistors Q3, Q4, and Q7 are on and conducting current and transistors Q2, Q5, and Q6 are effectively off. Since no current flows across RCA, collector voltage of transistor Q2 equals ECL VCC, causing VOUTA to a high level equalling −1 Vbe through Q1. RCB is fixed such that the current through Q3 causes base voltage of transistor Q8 to be −1 Vbe. However, because no current flows through RCB2, making the base voltage on Q9 equal to ECL VCC, the wired-OR effect of Q8 and Q9 forces VBOUT equal to a high level or −1 Vbe since Q9 is on, even though Q8 is off.

If VIN is −2 Vbe, transistors Q3, Q4, and Q6 are on and transistors Q2, Q5, and Q7 are effectively off. Since no current flows across RCA, collector voltage of transistor Q2 equals ECL VCC causing VOUTA to a high level equalling −1 Vbe. The current through Q3 causes base voltage on transistor Q8 to be −1 Vbe, and the current through Q6 causes the base voltage on transistor Q9 to be −1 Vbe. Since the base voltages on both Q8 and Q9 are −1 Vbe, VOUTB is forced low at −2 Vbe.

If VIN is −3 Vbe, transistors Q2, Q4, and Q6 are on and transistors Q3, Q5, and Q7 are effectively off. The current through Q2 causes the base voltage of Q1 to be at −1 Vbe forcing VOUTA low at −2 Vbe. The current through Q6 causes the base voltage of Q9 to equal −1 Vbe. However, because negligible current flows through RCB, the base voltage of transistor Q8 equals ECL VCC, thus forcing VOUTB high at −1 Vbe.

If VIN is −4 Vbe, transistors Q2, Q5, and Q6 are on and conducting current and transistors Q3, Q4, and Q7 are effectively off. The current through Q2 causes the base voltage of transistor Q1 to be at −1 Vbe forcing VOUTA low at −2 Vbe. The current through Q6 causes the base voltage of Q9 equal to −1 Vbe. The current through Q5 causes the base voltage of Q8 to equal −1 Vbe. Since the base voltages on both Q8 and Q9 are at −1 Vbe, VOUTB is forced to a low level or −2 Vbe.

One unique capability of this decoder circuit is the ability to selectively isolate information relating to the state of the B input signal from the value of the discrete input signal. This value is determined by whether the nominal voltage range of −2.5 Vbe to −3.5 Vbe, or −3 Vbe. This circuit is faster, consumes less power, and has a lower device count than existing circuits.

Once the binary signals on VOUTA and VOUTB are generated, they are then received on a select/latch network 28. The select/latch network 28 includes six latches, wherein VOUTA connects to the D inputs of three primary latches and VOUTB connects to D inputs of the other three secondary latches. Each latch is enabled by various combinations of C1, C1 bar, C0 and C0 bar clocking inputs, such that the binary output levels on YA0 and ZB0, YA1 and ZB1, YA2 and ZB2, and YA3 and ZB3 are generated during time slot 0, 1, 2, and 3 respectively. During time slot 0, for example, the binary output levels on YA0 and ZB0 correspond directly with the binary input levels A0 and B0. The same applies for the remaining time slots: during time slot 1, signals on YA1 and ZB1 equal signals on A0 and B0; during time slot 2, signals on YA2 and ZB2 equal signals on YA2 and ZB2; and during time slot 3 signals on YA3 and ZB3 equal signals on A3 and B3.

The latch/select network can best be explained by examining the operation of each latch. FIG. 8 depicts an ECL-type latch circuit with an active low enable used in the present invention. The latch circuit latches the input on pin D to pin Q output whenever EN bar is low. Referring again to FIG. 7, a low level signal on node 32, or 34, or 36 will latch VOUTA and VOUTB binary signals onto A0 and B0, A1 and B1, or A2 and B2 respectively. For example, to select A0 and B0 by placing a low on node 32, C0 must be high and C1 low (time slot 0); to select A1 and B1 by placing a low on node 34, C0 must be 1 and C1 high (time slot 1); to select A2 and B2 by placing a low on node 36, C0 must be low and C1 high (time slot 2). Only three latches are required since the fourth time slot automatically latches and transmits VOUTA and VOUTB whenever C0 and C1 are both low.

During each time slot, the select/latch network 28 operates to select and latch a binary output pair (either YA0 ZB0, YA1 ZB1, YA2 ZB2, or YA3 ZB3) that directly corresponds to the same logic state as the binary input pair (either A0 B0, A1 B1, A2 B2, or A3 B3 respectively) Whenever a distinct pair of latches are enabled by a low level on either node 32, 34, or 36, an output pair (either A0 B0, or A1 B1, or A2 B2 respectively) are output-enabled. Therefore, during a set time slot, minus any propagation delay over the transmission line, a pair of binary input signals are time/voltage encoded and transmitted over a single VOUT/VIN line to the decoder 14 such that a pair of binary output lines are selected and binary output signals, logically equivalent to the pair of input signals, are placed on them. In summarizing the aforesaid discussion, the 1:8 decoder 14 decodes the single received time-voltage encoder signal into eight virtual binary signals, according to the following table:

| VIN | C1 | C0 | Bits Decoded | | Decod VOUTA Output | Decod VOUTB Output |
|---|---|---|---|---|---|---|
| −1 Vbe | 0 | 1 | A0=1 | B0=1 | 1(−1 Vbe) | 1(−1 Vbe) |
| −2 Vbe | 0 | 1 | A0=1 | B0=0 | 1(−1 Vbe) | 0(−2 Vbe) |
| −3 Vbe | 0 | 1 | A0=0 | B0=1 | 0(−2 Vbe) | 1(−1 Vbe) |
| −4 Vbe | 0 | 1 | A0=0 | B0=0 | 0(−2 Vbe) | 0(−2 Vbe) |
| −1 Vbe | 1 | 1 | A1=1 | B1=1 | 1(−1 Vbe) | 1(−1 Vbe) |
| −2 Vbe | 1 | 1 | A1=1 | B1=0 | 1(−1 Vbe) | 0(−2 Vbe) |
| −3 Vbe | 1 | 1 | A1=0 | B1=1 | 0(−2 Vbe) | 1(−1 Vbe) |
| −4 Vbe | 1 | 1 | A1=0 | B1=0 | 0(−2 Vbe) | 0(−2 Vbe) |
| −1 Vbe | 1 | 0 | A2=1 | B2=1 | 1(−1 Vbe) | 1(−1 Vbe) |
| −2 Vbe | 1 | 0 | A2=1 | B2=0 | 1(−1 Vbe) | 0(−2 Vbe) |
| −3 Vbe | 1 | 0 | A2=0 | B2=1 | 0(−2 Vbe) | 1(−1 Vbe) |
| −4 Vbe | 1 | 0 | A2=0 | B2=0 | 0(−2 Vbe) | 0(−2 Vbe) |
| −1 Vbe | 0 | 0 | A3=1 | B3=1 | 1(−1 Vbe) | 1(−1 Vbe) |
| −2 Vbe | 0 | 0 | A3=1 | B3=0 | 1(−1 Vbe) | 0(−2 Vbe) |
| −3 Vbe | 0 | 0 | A3=0 | B3=1 | 0(−2 Vbe) | 1(−1 Vbe) |
| −4 Vbe | 0 | 0 | A3=0 | B3=0 | 0(−2 Vbe) | 0(−2 Vbe) |

Referring again to FIG. 7, it should be noted that in DC operation, either Q3 or Q5 may be on or off, but both will not be on at the same time since VIN cannot be greater than −2.5 Vbe and less than −3.5 Vbe. If both devices were on, there would be an excess voltage drop across RCB and thus possibly saturating the current switch transistors Q3 and Q5, QC is added to insure than the collector voltages on Q3 and/or Q5 are clamped to acceptable levels by providing the necessary transient current during VIN transitions.

FIG. 9a and 9b depict a conventional voltage reference generator and the voltage reference generator for use in the present invention respectively. Referring now to FIG. 9b, a circuit diagram illustrates the voltage reference generator 26 of the present invention. The −1.5 Vbe, −2.5 Vbe, and −3.5 Vbe voltages used for Vref1, Vref2, and Vref3 respectively, requires a special voltage reference generator 26 depicted in FIG. 9b. The voltage reference generator 26 is unique in that it incorporates parallel connected transistors rather than series connected transistors. As illustrated in FIG. 9a, a conventional ECL voltage regulator operates by using successive diode drops across series coupled transistors Q1, Q2 and Q3. The voltage drop across each diode is dependent upon the temperature coefficients of each diode. The conventional diode-dividing scheme used to generate decode reference levels would be acceptable, and the decoder reference voltages will track the encoder reference voltages if 1) the encoder also uses a similar diode-dividing scheme, and 2) the encoder and decoder are subject to similar temperature conditions. However, when using multi-value voltage encoding of the present invention, a special ECL voltage regulator is required since the temperature behavior between the encoder and decoder does not track that of conventional ECL circuits. Thus, multi-value voltage encoding achieves voltage division by weighing currents through a current switch. Since one emitter follower transistor (QEF2) is employed in the encoder circuit 12, the temperature behavior of the encoded signal on VOUT/VIN pin 22 is a function of only one diode. Thus, the ECL voltage reference generator 26 of the present invention is used since the generated reference voltages are functions of only one diode as well. By placing the divider transistors in parallel rather than in series, the reference voltages of the ECL voltage reference generator 26 are only dependent upon one diode: either Q1, Q2, or Q3.

Although the preceding has been a description of the preferred embodiment in which specific circuitry have been provided, it should be appreciated that this information is intended to explain the invention and not to limit it. The present invention can be used for binary signals on N input pins. The encoder can encode N binary input signals onto a single data stream, and subsequently, decode the single data stream into N binary output signals. The above circuitry describes only one embodiment, an 8:1 encoder and 1:8 decoder for transmitting eight binary signals; however, it should be clearly appreciated that the present invention can accommodate N binary signals which can be more or less than eight binary signals. Further, although an embodiment utilizing binary coding has been described, Gray coding may also be utilized to obviate problems caused by gliches.

What is claimed is:

1. A transmission system for transmitting N, N being an integer, binary input voltage signals, each having a magnitude equal to either a first or a second voltage level and received on N input signal ports, out of a single output port, said system comprising:

a clock generating for setting the states of a plurality of clock signals to define a set of M, M being a fixed integer less than N, sequential time slots; and a time/voltage concurrent encoder, adapted to receive said N binary signals and said clock signals, for selecting a distinct subset of N/M of said binary input signals and concurrently converting said selected N/M binary signals into a corresponding one of $2^{**}(N/M)$ discrete predetermined voltage levels during each time slot, with the corresponding voltage level uniquely encoding the values of the selected N/M binary input signals so that the encoded values of said N binary input signals are transmitted out of the single output port during said M sequential time slots.

2. The invention of claim 1 wherein said encoder comprises:

a set of M single stage multi-level encoders, each single stage encoder coupled to receive a unique subset of N/M binary input signals associated with a unique corresponding time slot, with each single stage encoder selected during the corresponding time slot, and with each single stage encoder for encoding the (M/N) received binary signals into a corresponding one of said $2^{**}(N/M)$ discrete predetermined voltage levels when selected.

3. The invention of claim 2 wherein said single stage encoder is implemented as an emitter-coupled logic-type circuit that conducts current from a VCC terminal to a VEE terminal and where said circuit receives a reference voltage having a value between the high and low binary voltage values, the encoder comprising:

a first resistor coupling a first collector ANDed output node to VCC;

a second resistor coupling a second collector ANDed output node to VCC;

and wherein each single stage encoder comprises:

N/M emitter-coupled comparators, all having current inputs coupled to said first and second nodes and each having a current output coupled to VEE through an associated current source providing an associated fixed magnitude of current, with each emitter-coupled comparator having a first logic input coupled to an associated one of said N/M binary signals and every emitter-coupled comparator having a second logical input tied to the reference voltage, and with each emitter-coupled comparator for steering its associated fixed amount of current through said first node if its associated binary signal is in a first state and through said second node if said associated binary signal is in a second state so that the value of the discrete voltage level on said first node uniquely encodes the binary values of said N/M binary signals.

4. The invention of claim 3 wherein the discrete voltage levels at said second node vary inversely as the discrete voltage levels at node 1 and further comprising:
a pull-up transistor having a first terminal coupled to said VCC terminal, a base terminal coupled to said first node, and a second terminal coupled to an output port, said pull-up transistor for conducting current from said VCC terminal to said output port;
a pull-down transistor having a first terminal coupled to said output port, a base terminal coupled to said VEE terminal via a control resistor, and a second terminal coupled to said VEE terminal, said pull-down transistor for conducting current from said output terminal to said VEE terminal;
a pull-down control transistor having a first terminal coupled to said VCC terminal, a base terminal coupled to said second node, and a second terminal coupled to said base terminal of said pull-down transistor via a current supply resistor; and
a control resistor coupling said base of said pull-down transistor and said current supply resistor to said VEE terminal.

5. A time-voltage decoder comprising:
a voltage level generator for generating $(2^{}X)-1$ ordered voltage levels to partition a predetermined voltage interval into $2^{}X$ subintervals;
a non-binary converter, adapted to receive an input voltage signal having an amplitude equal to one level in a set of $2^{**}X$ predetermined discrete voltage levels, with each discrete voltage level included in an associated one of said subintervals and uniquely encoding the values of a set of X binary signals, said non-binary converter for converting said received input voltage signal into X decoded binary output signals;
a clock generator for setting the states of a plurality of clock signals to define a set of M, M being a fixed integer, sequential time slots;
a data latch network, having an ordered set of N output ports, N being an integer equal to the product of M multiplied by X and adapted to receive said clock signals and said decoded binary output signals, with said N output ports partitioned into M subsets of X output ports and each subset associated with a given time slot, said network for latching said X decoded binary output signals received during the given time slot onto the X output ports of the subset associated with the given time slot.

6. The invention of claim 5 wherein N is 8 and the reference voltage levels are VR1, VR2, VR3 with VR3 having the most negative voltage, with said decoder implemented in an emitter-coupled logic-like (ECL) circuit that conducts current from a VCC terminal to a VEE terminal and comprises:
a first emitter-coupled comparator having a first logic input coupled to said input voltage signal and a second logic input coupled to VR1;
a second emitter-coupled comparator having a first logic input coupled to said input voltage signal and a second logic input coupled to VR2;
a third emitter-coupled comparator having a first logic input coupled to said input voltage signal and a second logic input coupled to VR3;
a first logic circuit, having an input coupled to the output terminal of the said second comparator, for setting the value of a first decoded output signal to a first binary state only if the magnitude of said input voltage signal is greater than VR2;
a second logic circuit, having inputs coupled to the outputs of the said first, second, and third comparators, for setting the value of a second decoded output signal to said first binary state only if the magnitude of said input voltage signal is greater than VR1 or in the interval from VR2 to VR3.

7. A transmission system, of the type including a system clock signal for defining system clock cycles, for transmitting N, N being an integer, binary input signals each characterized by a first or a second state, through a single output port, said system comprising:
a time slot generator, adapted to receive said system clock signal, for setting the states of a plurality of clocking signals to define a set of M, M being a fixed integer, sequential time slots during each system clock cycle;
a time/voltage concurrent encoder, adapted to receive said N binary signals and said clock signals, for dividing said N binary signals into M time slots, generating a distinct subset of N/M of said binary input signals and concurrently converting the said selected binary input signals into a corresponding one of $2^{**}(N/M)$ discrete predetermined voltage levels during each time slot, with the corresponding voltage level uniquely encoding the values of the selected N/M binary signals;
a voltage level generator for generating $(2^{}(N/M))-1$ ordered voltage levels to partition a predetermined voltage interval into $2^{}(N/M)$ subintervals;
a non-binary converter, adapted to receive an input voltage signal having an amplitude equal to one level in a set of $2^{**}(N/M)$ predetermined discrete voltage levels, with each discrete voltage level included in an associated one of said subintervals and uniquely encoding the values of a set of N/M binary signals, said non-binary converter for converting said received input voltage signal into N/M decoded binary output signals, each corresponding to one of said N/M binary signals encoded by said received input signal.

8. In a multi-level logic system of the type that generates discrete voltage levels on a first node and complementary discrete voltage levels on a second node, an output buffer for providing dynamic pull-down to reduce output slew for large signal deltas, said system comprising:
a pull-up transistor having a first terminal coupled to said VCC terminal, a base terminal coupled to said first node, and a second terminal coupled to an output port, said pull-up transistor for conducting current from said VCC terminal to said output port;

a pull-down transistor having a first terminal coupled to said output port, a base terminal coupled to said VEE terminal via a control resistor, and a second terminal coupled to said VEE terminal, said pull-down terminal for conducting current from said output terminal to said VEE terminal;

a pull-down control transistor having a first terminal coupled to said VCC terminal, a base terminal coupled to said second node, and a second terminal coupled to said base terminal of said pull-down transistor via a current supply resistor; and a control resistor coupling said base of said pull-down transistor and said current supply resistor to said VEE terminal.

* * * * *